G. CZIPPAN.
AUTO TURNING DEVICE.
APPLICATION FILED JULY 19, 1918.

1,301,659.

Patented Apr. 22, 1919.
2 SHEETS—SHEET 1.

Inventor
Gyorgy Czippan
By Victor J. Evans
Attorney

G. CZIPPAN.
AUTO TURNING DEVICE.
APPLICATION FILED JULY 19, 1918.
1,301,659.
Patented Apr. 22, 1919.
2 SHEETS—SHEET 2.
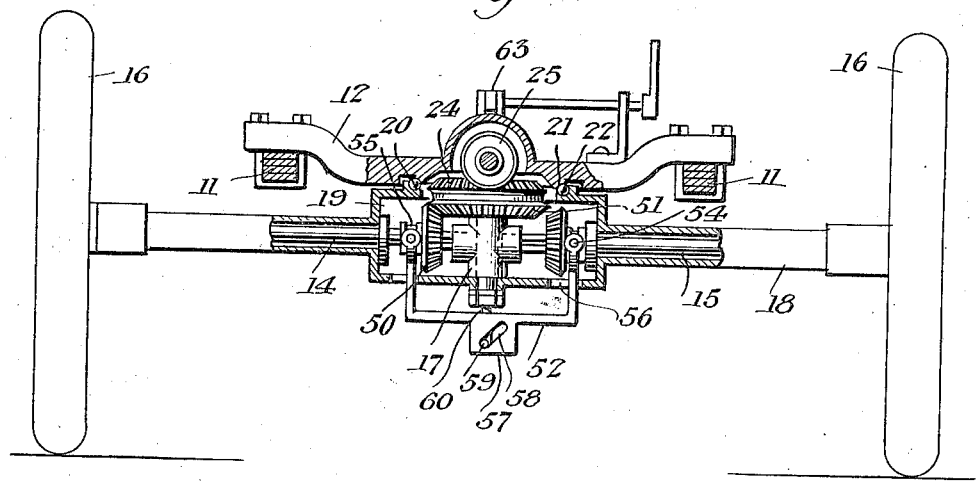
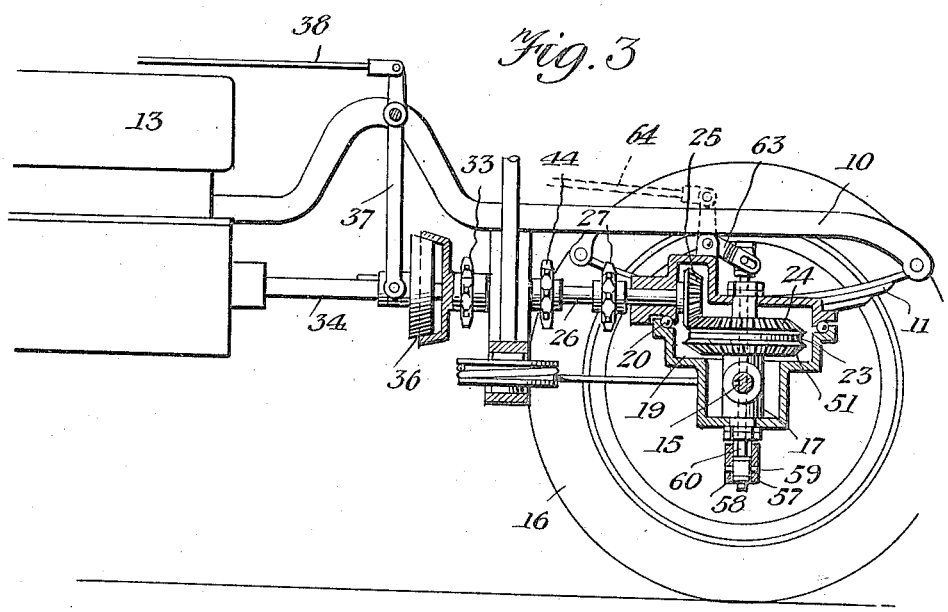
Inventor
Gyorgy Czippan
By Victor J. Evans
Attorney

UNITED STATES PATENT OFFICE.

GYORGY CZIPPAN, OF PHILADELPHIA, PENNSYLVANIA.

AUTO-TURNING DEVICE.

1,301,659. Specification of Letters Patent. Patented Apr. 22, 1919.

Application filed July 19, 1918. Serial No. 245,697.

*To all whom it may concern:*

Be it known that I, GYORGY CZIPPAN, residing at Philadelphia, in the county of Philadelphia and State of Pennsylvania, have invented new and useful Improvements in Auto-Turning Devices, of which the following is a specification.

This invention relates to improvements in motor vehicles, the object being to provide motor driven means for steering the vehicle, the invention being especially useful upon heavy trucks, tractors or the like.

To this end the invention includes a pivoted axle having its inner ends connected by means of suitable gearing with the motor of the vehicle, the connection being such as to permit of selectively rotating one section of the axle and leaving the other section free, while means interposed between the gearing and the motor provides for regulating the direction of rotation of the axle, the entire mechanism being controlled from the driver's seat.

A further object is to provide a mechanism by means of which the vehicle may be turned in an unusually small space, the mechanism providing for a sharp quick turn of the vehicle.

Other objects and advantages of the invention will appear as the following description is read in connection with the accompanying drawings:—

In the drawings:—

Fig. 2 is an end view with parts broken away to more clearly show the mechanism;

Fig. 3 is a longitudinal central sectional view;

Referring in detail to the drawings, like characters of reference denote corresponding parts throughout the several views.

Figure 1:
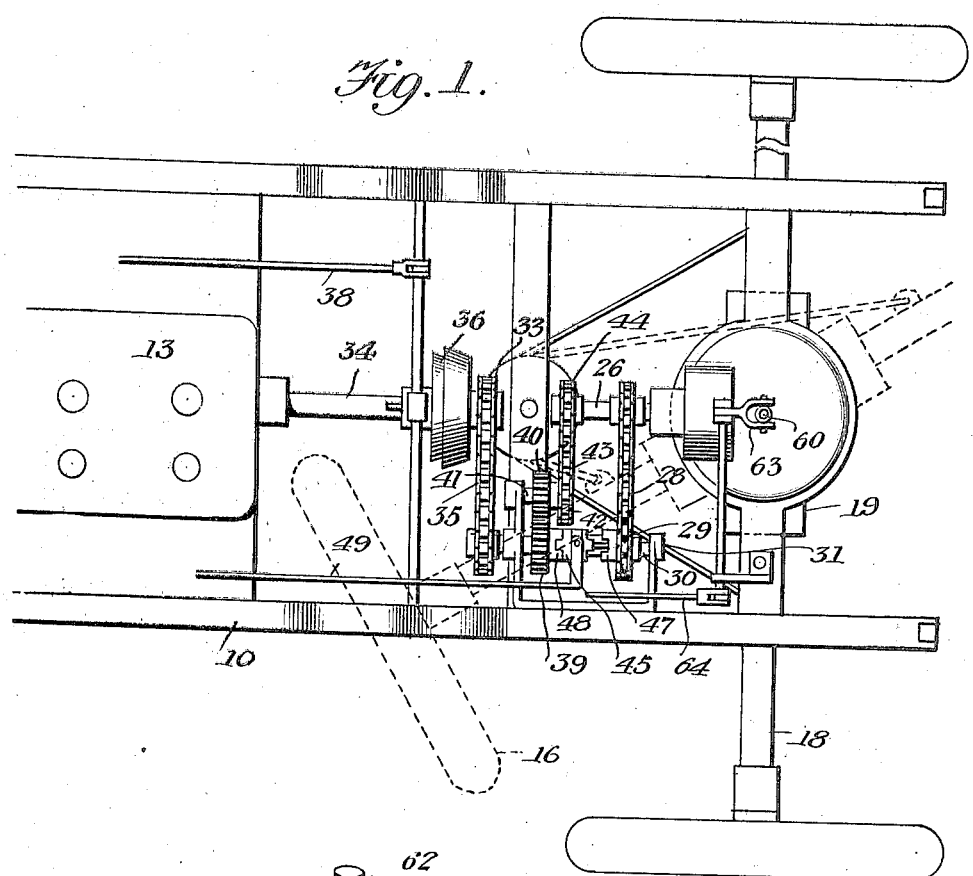
Figure 1 is a plan view of the front end of the motor vehicle with the invention applied thereto.
Figures 4, 5:
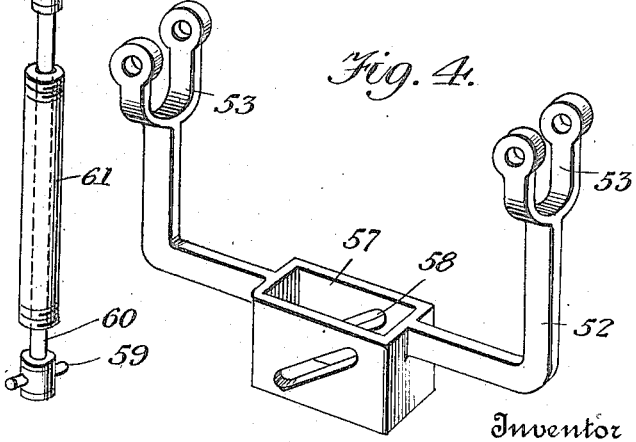
Fig. 4 is a detail perspective view of the gear shift yoke.
Fig. 5 is a similar view of the vertically movable rod employed for shifting this yoke, the sleeve which surrounds the rod being shown thereon.

The invention is herein illustrated as applied to the front axle of a motor driven vehicle, the side bars of the vehicle frame being shown at 10 and the transverse bars or bolsters to which the springs 11 are connected being shown at 12. The foregoing may be of any suitable or desired structure to provide for the support of the vehicle body, the running gear and the driving and steering mechanism of the vehicle. The motor 13 by means of which the vehicle is driven in the ordinary or any preferred manner is supported upon the vehicle frame between the side bars thereof.

The front axle of the vehicle, which is shown in the drawings as the steering axle is formed in two sections 14 and 15. These sections have mounted upon their outer ends in the usual manner wheels 16, while their inner ends are rotatably mounted within the bearing member 17. Each axle section is also inclosed within a housing 18, the central portion of which provides a casing 19 for receiving the steering mechanism. The upper face of the casing 19 is provided with a ball race 20, while the bar 12 is provided with a similar race 21 for the reception of anti-friction balls 22. This forms a fifth wheel or pivot upon which the front axle is adapted to swing in steering the vehicle.

Mounted upon the bearing member 17 is a double face beveled gear 23, the upper teeth 24 of which engage a beveled pinion 25 mounted upon one end of a short shaft 26. The shaft 26 has secured thereon a sprocket wheel 27, which is connected by means of a chain 28 with a sprocket wheel 29 loosely mounted upon a countershaft 30 in bearings 31 carried by one of the side members 10 of the vehicle frame. Fast upon the shaft 30 is a sprocket wheel 32, which is driven from a sprocket wheel 33 mounted upon a shaft 34, a chain 35 connecting these wheels. The shaft 34 is driven by the motor 13 and the rotation of the sprocket 33 is controlled by a clutch 36 operated by a pivoted lever 37 through the medium of a clutch rod 38, the latter extending to within convenient reach of the driver of the vehicle.

Loosely mounted upon the shaft 30 is a pinion 39, which engages a pinion 40 mounted upon a short shaft 41. The shaft 41 has mounted thereon a sprocket 42 which is connected by means of a chain 43 with a sprocket 44 also mounted upon the shaft 26. Interposed between the sprocket 29 and the pinion 39 is a sliding clutch member 45 which is adapted to engage either the clutch face 46 or the clutch face 47 carried respectively of the sprocket 29 and the pinion 39. The clutch member 45 is operated through the medium of a rod 49 which also extends within convenient reach of the vehicle driver.

When the clutch 36 is engaged and the clutch member 45 is engaged with the clutch face 47 of the sprocket 29, the gear 23 will be rotated in one direction. In order to change the direction of rotation of the gear 23, the clutch member 45 is moved into engagement with the clutch face 48, when the gear 23 is driven through the pinion 40 and sprocket chain 43.

Slidably mounted upon the inner end of each of the axle sections 14 and 15, is a beveled gear 50, either one of which is adapted to engage and be driven from beveled gear teeth 51 formed upon the lower face of the gear 23. The gears 50 are connected through the medium of a gear shift yoke 52, the bifurcated ends 53 of which carry pins 54 which engage a grooved hub 55 carried by the gears 50. The yoke 52 is capable of longitudinal movement with respect to the front axle and is guided in slots 56 located in the bottom of the casing 19. The lower end of this yoke carries a substantially rectangular frame 57, which is provided with oppositely located diagonal slots 58. These slots are adapted to receive pins 59 located upon one end of a vertically movable rod 60. This rod extends through a sleeve 61 located within the bearing member 17 and the upper end of the said rod is also provided with oppositely extending pins 62. These latter pins are engaged in slots provided in one arm of a bell crank lever 63, the other arm of which is pivotally connected to a rod 64 extending to within convenient reach of the vehicle driver.

A pull upon the rod 64 will, through the bell crank lever 63 slide the shaft 60 upward, so that the pins 59 through their engagement with the slots 58 will cause the yoke 52 to move longitudinally of the front axle and engage the gear 50 mounted upon the end of the axle section 15 with the gear 23. This will result in a rapid rotation of the wheel 16 connected to the axle section 15 and cause a quick sharp turning of the vehicle. By lowering the rod 60 the parts will assume the position shown in Fig. 2 with the gear 50 of the section 14 in engagement with the gear 23.

It is believed that when the foregoing description is read in connection with the accompanying drawings, the construction, operation and advantages of the invention will be apparent.

The invention is susceptible of various changes in its form, proportions and minor details of construction and the right is reserved to make such changes.

Having described the invention, what is claimed is:—

1. The combination with a vehicle having a pivoted front axle formed in two sections, and a motor for operating the vehicle, of means for connecting each section of the axle with the motor for rotating the connected section, and means including a yoke slidable along said axle and controlled by means extending to within convenient reach of the driver for selectively connecting the section.

2. The combination with a vehicle having a pivoted front axle formed of two sections, and a motor for operating the vehicle, of means including a gear slidably mounted upon each section for connecting one of the sections with the motor, a yoke slidable along said axle for controlling the position of the gears and a rock shaft connected to said yoke for selectively positioning the gears to control the direction of travel of the vehicle.

3. The combination with a vehicle having a pivoted front axle formed of two sections, and a motor for operating the vehicle, of means including a gear slidably mounted upon each section for connecting one of the sections with the motor, a sliding yoke connecting said gears and means including a vertically slidable rod having a slot and pin connection with the yoke for sliding the latter to selectively connect the motor to one section of the axle.

4. The combination with a motor driven vehicle having a pivoted front axle formed in two sections, of a motor driven gear located near the inner ends of the axle sections for driving said axle, a gear slidably mounted upon the inner end of each axle section, a yoke connecting the last mentioned gears, a vertically movable rod, a pin carried by said rod for engagement with a diagonal slot formed in the yoke, whereby a vertical movement of the pin will impart a horizontal movement to the yoke to slide the gears and means whereby the driver of the vehicle may operate the vertical movable rod to selectively engage the sliding gears with the motor driven gear to control the direction of travel of the vehicle.

In testimony whereof I affix my signature.

GYORGY CZIPPAN.

Copies of this patent may be obtained for five cents each, by addressing the "Commissioner of Patents, Washington, D. C."